(12) United States Patent
Rose

(10) Patent No.: US 6,422,105 B1
(45) Date of Patent: Jul. 23, 2002

(54) ELECTRONIC MODULATING SYNCHRONIZER

(75) Inventor: Jonathan S. Rose, Laurinburg, NC (US)

(73) Assignee: ZF Meritor, LLC, Laurinburg, NC (US)

(*) Notice: Subject to any disclaimer, the term of this patent is extended or adjusted under 35 U.S.C. 154(b) by 0 days.

(21) Appl. No.: 09/657,644

(22) Filed: Sep. 7, 2000

(51) Int. Cl.[7] .............................................. F16D 23/04
(52) U.S. Cl. ........................................ 74/339; 192/53.1
(58) Field of Search .............................. 74/335, 336 R, 74/339; 192/53.1, 103 F

(56) References Cited

U.S. PATENT DOCUMENTS 4,023,443 A * 5/1977 Usui et al. ................. 192/53.1
4,603,596 A * 8/1986 Akashi et al. ............... 477/124
4,676,115 A * 6/1987 Morscheck et al. ........... 74/339
4,817,470 A * 4/1989 Muller et al. ............... 477/110

FOREIGN PATENT DOCUMENTS

JP          4-300426 A    * 10/1992

* cited by examiner

Primary Examiner—Charles A. Marmor
Assistant Examiner—Ankur Parekh
(74) Attorney, Agent, or Firm—Carlson, Gaskey & Olds

(57) ABSTRACT

An improved synchronizer uses a friction element to induce a frictional torque to rotating gear and collar elements. The rotational speeds of the gear and collar elements are electronically monitored by a transmission control unit. When the transmission control unit has determined that the rotational speeds of the gear and the collar are equalized, another control drives the collar to engage the gear.

15 Claims, 1 Drawing Sheet

ELECTRONIC MODULATING SYNCHRONIZER

BACKGROUND OF THE INVENTION

This invention relates to a system for synchronizing the collar and gear of heavy vehicle transmissions that operates using an electronic monitor and a frictional member.

Typically in heavy transmissions, there is a main gear box and an auxiliary box. The auxiliary box may be a range box, a splitter box, or a combination. In an auxiliary box the gear speeds are typically changed by moving a sliding element, which may be known as a collar, between a position where it engages a first gear, and a position where it engages a second gear. As this movement is completed, it becomes necessary for the collar and the gear which is to be engaged to approach a similar speed, or to be "synchronized". The system now used to synchronize the RPM of the collar and gear uses a synchronizing pin that mechanically blocks the collar from engaging the gear until the RPM of collar and gear are equalized. These synchronizing pins are usually quite costly because the parts require tight tolerances. Generally, the synchronizers require close positioning, and result in vibration, etc. if the components are offset or out of tolerance. Further, the synchronizer pins are susceptible to failure when drive lines are not set up properly, and may induce a vibration into the transmission.

More recently, assisted shift systems have been developed which control engine output such that the speed of rotating components to be brought into engagement, reach a synchronized speed for the next gear. With such systems, monitoring of actual shaft speed is utilized.

The creation of a synchronizer system that does not use pins to block engagement until the collar and gear RPM are equalized, would be desirable.

SUMMARY OF THE INVENTION

In a disclosed embodiment of this invention, a synchronizing assembly includes a rotatable collar, a rotatable gear, and a friction element positioned between the two. The friction element is splined to the collar but is free to move axially. A set of springs is positioned between the collar and the friction element. The gear has a machined surface to receive the adjacent friction element. A transmission control unit monitors the speed of the collar and gear. The axial position of the collar is also monitored by the transmission control unit. When gear change is initiated, a control valve is energized causing the collar to move axially toward the gear. The collar moves until the friction element contacts the gear surface. Preferably, the control valve is then modulated causing brief momentary contact of the gear and friction element. A frictional torque is created which causes equalization of collar and gear speed. Collar and gear speed continue to be monitored by the transmission control unit until they are equal, or at least within a small predetermined maximum difference. At this point, the control valve is energized allowing the collar to compress the spring between it and the friction element and engage the gear. In a second embodiment, the friction element could also be controlled by a valve separate from the collar valve, eliminating the need for the springs.

The electronically monitored and frictionally induced equalizing of the gear and the collar of the synchronizer assembly of the present invention succeeds in synchronizing collar and gear speed without the use of a synchronizing pin. Thus, the invention eliminates the costly manufacture of high tolerance parts and reduces the incidence of failure due to improper drive line setup.

These and other features of the present invention can be understood from the following specification and drawings, the following of which is a brief description.

DETAILED DESCRIPTION OF THE DRAWINGS

Figure 1:
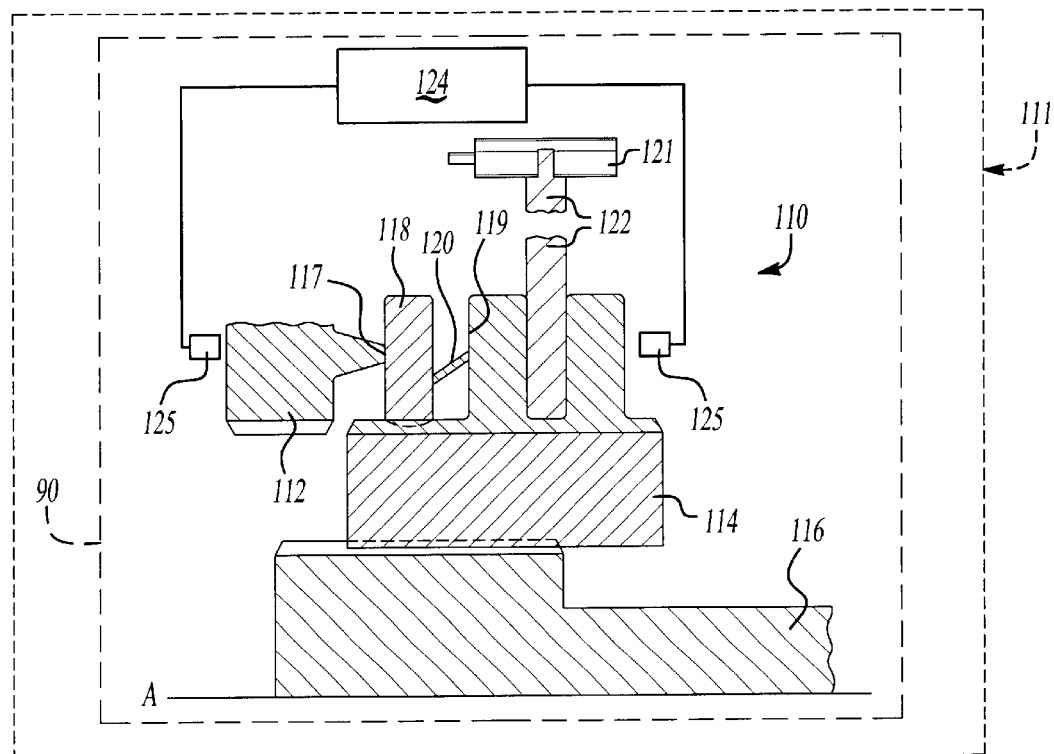
FIG. 1 schematically shows a cross sectional view of the electronic synchronizing system of the present invention.

As shown schematically in cross section in FIG. 1, the electronic synchronizer system 110 of the present invention includes gear 112 and collar 114 which is splined to output shaft 116. This system 110 is in a transmission 111, shown schematically. More particularly, the system 110 is part of an auxiliary 90, also shown schematically. Gear 112 is engaged to achieve a particular speed ratio from the auxiliary box 90. Gear 112, collar 114, and output shaft 116 are rotatable about axis A. Collar 114 also moves axially with respect to gear 112 for engagement and disengagement. A friction element 118 is provided between the gear facing surface 117 and the collar facing surface 119. Friction element 118 is splined to collar 114 but is also free to move axially with respect to collar 114. There is also a spring element 120 positioned between friction element 118 and collar facing surface 119. Spring element 120 may be a Belleville or coil type spring. Gear facing surface 117 is machined to enable gear 112 to frictionally engage friction element 118. The rotational speeds of gear 112 and collar 114 and the axial position of collar 114 are monitored by transmission control unit 124 through speed sensor 125, shown schematically.

When a gear change is initiated, a collar control valve and cylinder 121 move a yoke 122, causing collar 114 to move axially toward gear 112. The structure 121 and 122 are shown schematically. Valve and cylinder 121 drives the yoke 122 to reciprocate, as known. Once friction element 118 engages surface 117, the collar control valve 121 is modulated resulting in brief momentary contact of friction element 118 and gear facing surface 117 of gear 112. A frictional torque is thus created which equalizes the rotational speeds of collar 114 and gear 112. When the monitored rotational speeds of the collar 114 and gear 112 are electronically determined to be equalized by transmission control unit 124, collar control valve and cylinder 121 is then actuated. Collar 114 then moves axially toward gear 112 allowing the collar 114 to compress spring element 120 and engage gear 112. Although the members 117, 118 and 120 are only shown on one side of the collar 114, it should be understood that a similar arrangement would typically be placed on the right-hand side of the collar 114 also. Collar 114 moves to selectively engage a pair of gears 112.

Figure 2:
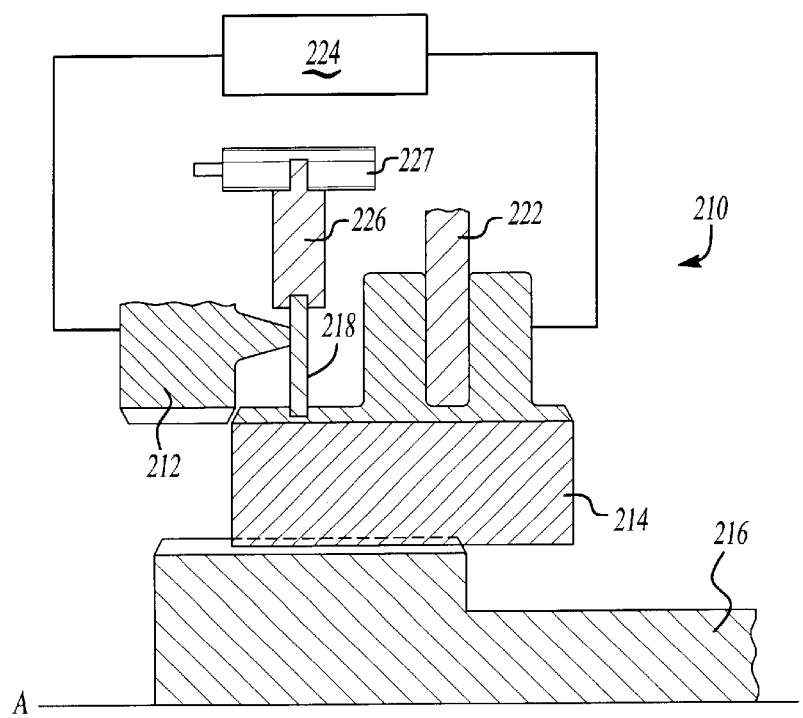
FIG. 2 schematically shows a cross sectional view of an alternative embodiment of the electronic synchronizing system of the present invention.

FIG. 2 schematically shows a cross sectional view of an alternative embodiment. The electronic synchronizer system, generally shown at 210, includes gear 212, collar 214, output shaft 216 and friction element 218 which operate identically to corresponding elements as set forth in the detailed description of FIG. 1. Transmission control unit 224 is provided to monitor the rotational speeds of gear 212 and collar 214 and to monitor axial movement of collar 214 and collar 226.

In this embodiment, axial movement of friction element 218 is controlled by friction yoke 226, having its own valve and cylinder arrangement 227, thus eliminating the use of spring element 120 of the embodiment of FIG. 1. Again, there may be a second friction element and gear on the opposed side of collar 214.

With respect to FIG. 2, synchronization proceeds as follows: When a gear change is initiated, a collar control valve and cylinder 227 drives yoke 226, causing friction element 218 to move axially toward gear 212. Friction yoke control valve 227 is then modulated resulting in brief momentary contact of friction element 218 and gear 212 creating a frictional torque which tends to equalize the rotational speeds of gear 212 and collar 214. The rotational speeds of gear 212 and collar 214 continue to be monitored by transmission control unit 224 and when deemed equalized, collar control valve 222 and friction element control valve 226 are actuated so that collar 214 may move axially toward, and ultimately, engage gear 212.

As will be understood, while the above disclosure mentions that the collar is driven when the speeds are equalized, there will preferably be a predetermined maximum difference, and once the difference in speed is below that maximum difference, then the collar may be energized. This maximum difference will be chosen to be sufficiently small such that the collar and gear can be easily engaged.

The above embodiments show the friction element carried with the collar. It is also within the scope of this invention that the friction element rotate with the gear, and be selectively brought into engagement with the collar.

A preferred embodiment of this invention has been disclosed, however, a worker in this art would recognize that certain modifications would come within the scope of this invention. For that reason, the following claims should be studied to determine the true scope and content of this invention.

What is claimed is:

1. A transmission comprising:

a gear;

a collar being engagable with said gear;

said gear and said collar being rotatable and having a speed of rotation about an axis;

an equalizing element movable with one of said gear and said collar, said equalizing element being repeatedly brought into and then out of contact with the other of said gear and said collar during a single shift transient to equalize said speed of rotation of said gear to said speed of rotation of said collar;

an electronic monitoring device to comparatively monitor said speed of rotation of said gear and said speed of rotation of said collar; and an engaging system that enables said collar to engage with said gear when said electronic monitoring device indicates that said speed of rotation of said gear and said speed of rotation of said collar are within a predetermined amount of each other.

2. A transmission as recited in claim 1, wherein said gear has a gear facing surface which faces said collar, and said collar has a collar facing surface which faces said gear, and said equalizing element is a friction element positioned between said gear facing surface and said collar facing surface.

3. A transmission as recited in claim 2, wherein a spring is positioned between said friction element and said collar facing surface.

4. A transmission as recited in claim 3, wherein said friction element is splined to and may move axially relative to said collar.

5. A transmission comprising:

a gear;

a collar being engagable with said gear;

said gear and said collar being rotatable and having a speed of rotation about an axis;

an equalizing element to equalize the speed of rotation of said gear to the speed of rotation of said collar;

an electronic monitoring device to comparatively monitor said speed of rotation of said gear and said speed of rotation of said collar; and an engaging system that enables said collar to engage with said gear when said electronic monitoring device indicates that said speed of rotation of said gear and said speed of rotation of said collar are within a predetermined amount of each other;

said gear has a gear facing surface which faces said collar, and said collar has a collar facing surface which faces said gear, and said equalizing element is a friction element positioned between said gear facing surface and said collar facing surface; and a first drive drives said collar and a second drive drives said friction element.

6. A transmission as recited in claim 5, wherein said friction element is splined to and may move axially relative to said collar.

7. A transmission as recited in claim 1, wherein said equalizing element is a friction element which is brought into contact with said gear.

8. A transmission comprising:

a gear;

a collar being engagable with said gear;

said gear and said collar being rotatable and having a speed of rotation about an axis;

said gear having a gear facing surface which faces said collar and said collar having a collar facing surface which faces said gear;

a friction element positioned between said gear facing surface and said collar facing surface, said friction element being movable with one of said gear and said collar and being repeatedly brought into and then out of contact with the other of said gear and said collar during a single shift transient to equalize said speed of rotation of said gear to said speed of rotation of said collar;

an electronic monitoring device to comparatively monitor said speed of rotation of said gear and said speed of rotation of said collar; and an engaging system which acts upon said collar and a spring positioned between said friction element and said collar facing surface that enables said collar to engage with said gear when said electronic monitoring device indicates that said speed of rotation of said gear within a predetermined amount of said speed of rotation of said collar.

9. A transmission as recited in claim 8, wherein said friction element is splined to and may move axially to said collar.

10. A transmission as recited in claim 8, wherein said friction element is brought into contact with said gear facing surface to equalize the speed of said gear and said collar.

11. A transmission as recited in claim 10, wherein said friction element is repeatedly brought into and out of engagement with said gear facing surface.

12. An electronic synchronizer system as recited in claim 10, wherein said friction element is splined to and may move axially to said collar.

13. An electronic synchronizer system comprising:

a gear;

a collar being engagable with said gear;

said gear and said collar being rotatable and having a speed of rotation about an axis;

said gear having a gear facing surface which faces said collar and said collar having a collar facing surface which faces said gear;

a friction element positioned between said gear facing surface and said collar facing surface to equalize the speed of rotation of said gear to the speed of rotation of said collar;

an electronic monitoring device to comparatively monitor said speed of rotation of said gear and said speed of rotation of said collar; and a first drive which acts upon said collar and a second drive which acts upon said friction element wherein said first and second drives enable said collar to engage with said gear when said electronic monitoring device indicates that said speed of rotation of said gear is within a predetermined amount of said speed of rotation of said collar.

14. A transmission as recited in claim 13, wherein said friction element is brought into contact with said gear facing surface to equalize the speed of said gear and said collar.

15. A transmission as recited in claim 14, wherein said friction element is repeatedly brought into and out of engagement with said gear facing surface.

* * * * *